United States Patent
Yasseri et al.

(10) Patent No.: US 11,124,659 B2
(45) Date of Patent: Sep. 21, 2021

(54) METHOD TO SELECTIVELY PATTERN A SURFACE FOR PLASMA RESISTANT COAT APPLICATIONS

(71) Applicant: Lam Research Corporation, Fremont, CA (US)

(72) Inventors: Amir A. Yasseri, San Jose, CA (US); Duane Outka, Fremont, CA (US); Hong Shih, Santa Clara, CA (US); John Daugherty, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 332 days.

(21) Appl. No.: 15/883,787

(22) Filed: Jan. 30, 2018

(65) Prior Publication Data
US 2019/0233658 A1    Aug. 1, 2019

(51) Int. Cl.
| | |
|---|---|
| *B05D 1/32* | (2006.01) |
| *C09D 5/00* | (2006.01) |
| *C09D 1/00* | (2006.01) |
| *C01G 25/02* | (2006.01) |
| *C23C 4/02* | (2006.01) |
| *C23C 4/12* | (2016.01) |
| *C23C 4/01* | (2016.01) |
| *C01F 7/02* | (2006.01) |
| *C23C 4/18* | (2006.01) |
| *C23C 4/10* | (2016.01) |
| *C23C 4/11* | (2016.01) |

(52) U.S. Cl.
CPC .............. *C09D 5/008* (2013.01); *B05D 1/32* (2013.01); *C01F 7/02* (2013.01); *C01G 25/02* (2013.01); *C09D 1/00* (2013.01); *C23C 4/01* (2016.01); *C23C 4/02* (2013.01); *C23C 4/10* (2013.01); *C23C 4/11* (2016.01); *C23C 4/12* (2013.01); *C23C 4/18* (2013.01)

(58) Field of Classification Search
CPC .......... B05D 1/32; B05D 1/322; B05D 1/325; C09D 5/008
See application file for complete search history.

(56) References Cited

U.S. PATENT DOCUMENTS

| | | | | |
|---|---|---|---|---|
| 4,412,377 A | * | 11/1983 | Nagashima | ......... H01L 21/4846 |
| | | | | 257/E23.006 |
| 4,747,421 A | * | 5/1988 | Hayashi | ................ B01F 3/0092 |
| | | | | 134/102.2 |
| 4,964,945 A | * | 10/1990 | Calhoun | ............... C23C 14/042 |
| | | | | 216/106 |
| 6,500,758 B1 | * | 12/2002 | Bowers | ............. H01L 21/32131 |
| | | | | 257/E21.306 |

(Continued)

FOREIGN PATENT DOCUMENTS

GB    2068834 A  *  8/1981  ............. H05K 3/048

OTHER PUBLICATIONS

Sugimura et al ("Photolithography based on organosilane self-assembled monolayer resist" Electrochmica Acta (2001) 103-107 (Year: 2001).*

*Primary Examiner* — Nathan H Empie
(74) *Attorney, Agent, or Firm* — Beyer Law Group LLP

(57) ABSTRACT

A method for providing a part with a plasma resistant ceramic coating for use in a plasma processing chamber is provided. A patterned mask is placed on the part. A film is deposited over the part. The patterned mask is removed. A plasma resistant ceramic coating is applied on the part.

12 Claims, 7 Drawing Sheets

(56) References Cited

U.S. PATENT DOCUMENTS

| | | | |
|---|---|---|---|
| 9,490,135 B2 | 11/2016 | Brown et al. | |
| 2002/0086153 A1* | 7/2002 | O'Donnell | C23C 14/083 428/336 |
| 2004/0077107 A1* | 4/2004 | Vogeli | B81C 1/00071 438/1 |
| 2007/0190707 A1* | 8/2007 | Izumi | H01L 51/0018 438/151 |
| 2007/0202446 A1* | 8/2007 | Takahashi | G03F 7/42 430/329 |
| 2015/0311044 A1* | 10/2015 | Sun | C23C 14/0694 428/139 |
| 2018/0330923 A1* | 11/2018 | Tran | C23C 16/04 |

\* cited by examiner

METHOD TO SELECTIVELY PATTERN A SURFACE FOR PLASMA RESISTANT COAT APPLICATIONS

BACKGROUND

The disclosure relates to a method for applying a thermal spray coating on a part. More specifically, the disclosure relates to a method for providing a patterned thermal spray coating on a part.

Thermal spray coatings are applied to parts to provide plasma resistant protection to the part. Such coatings are used in plasma processing chambers. A thermal spray coating may apply a ceramic yttrium containing coating on a surface of an aluminum oxide part.

SUMMARY

To achieve the foregoing and in accordance with the purpose of the present disclosure, a method for providing a part with a plasma resistant ceramic coating for use in a plasma processing chamber is provided. A patterned mask is placed on the part. A film is deposited over the part. The patterned mask is removed. A plasma resistant ceramic coating is applied on the part.

These and other features of the present disclosure will be described in more detail below in the detailed description of the disclosure and in conjunction with the following figures.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
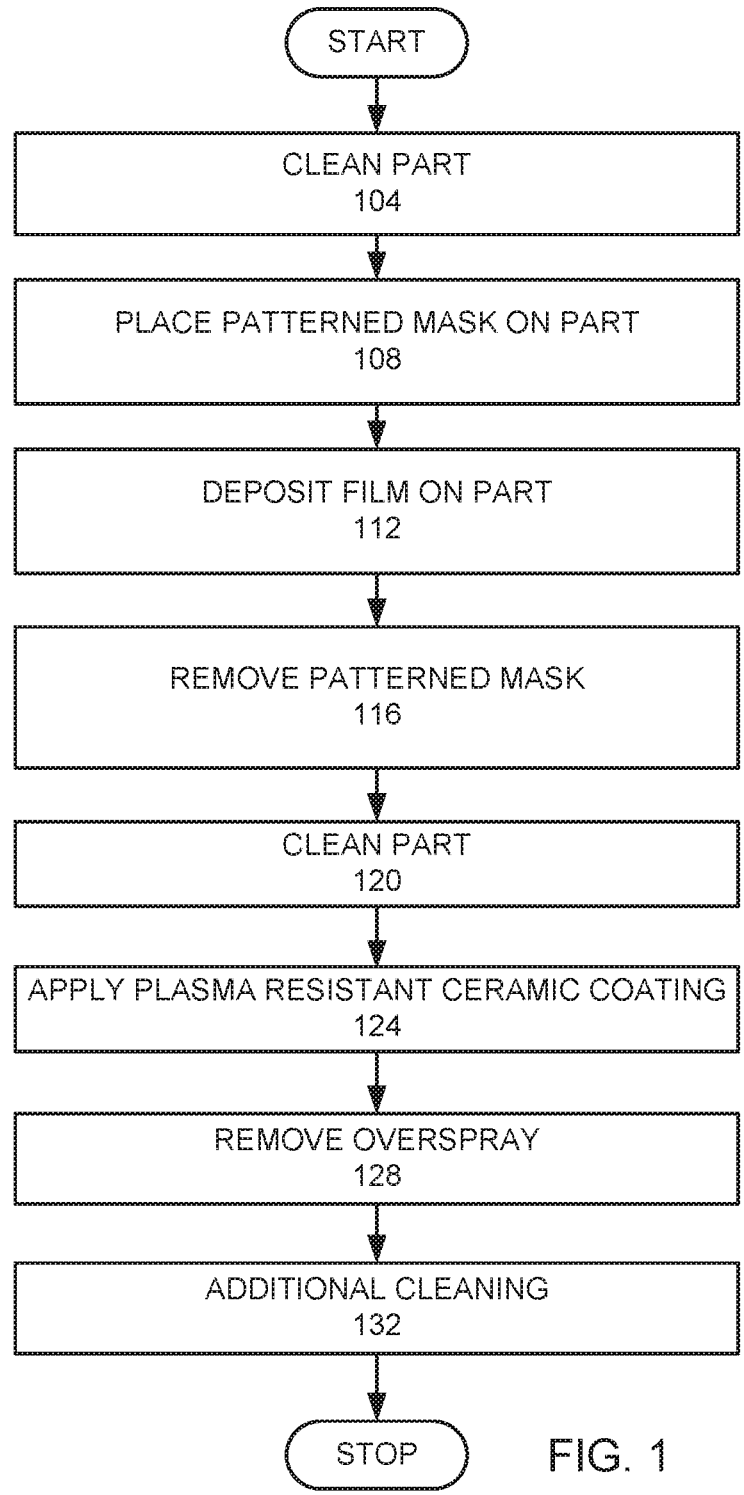
FIG. 1 is a high level flow chart of an embodiment.

The present disclosure will now be described in detail with reference to a few preferred embodiments thereof as illustrated in the accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures have not been described in detail in order to not unnecessarily obscure the present disclosure.

Plasma thermal spray coat materials such as yttria, zirconia, alumina have been deposited on anodized aluminum surfaces on parts such as pinnacles, high flow liners, and doors that are used in conductor etch chamber systems. However, changes to part design and growing complexity of part architecture have introduced an entirely new series of part fabrication challenges associated with accurately controlling the spray coat deposition process within more complicated part architectures. For example, one commonly observed problem has been the overspray effect during the deposition of the spray coating within high aspect ratio pump slot features of a high flow liner used in a conductor etch chamber. Conventional manufacturing methods used to spray coat the surfaces of the slots on the part lack selectivity to accurately deposit the spray coat within the intended areas without the effect of having an overspray coating deposited onto undesired areas as well. The overspray coating is undesirable and has led to lots of part quality related escalations, such as cosmetic anomalies including peeling, chipping, scalloping. More importantly, such escalations have manifested themselves as potential root causes leading to bad perception issues regarding poor defectivity performance concerns about the finished parts once such parts are installed in chambers for process testing.

In light of these concerns, there have been some attempts by spray coat manufacturers to try both hard and soft mask approaches during the plasma thermal spray coating deposition process to overcome the overspray deposition problems. However, conventional approaches have not been successful. One reason for the lack of progress is that conventional masking materials such as adhesives, paints, etc. have been found to be incompatible with the thermal spray coat deposition process conditions. Upon use, the conventional masking materials have been found to react, melt, and form unwanted byproducts that increase risk for contaminating the part. Hard mask approaches have also not been successful due to the fact that they often cause problems with modifying the spray flow pattern within complex architectures thereby negatively affecting the deposition process and leading to poor quality films.

Due to the lack of progress, there have been parallel efforts to remove the undesired overspray deposition by blasting techniques. However, use of traditional bead blasting techniques has presented their own new challenges as well. For example, due to the strong adhesion of the spray coat to the underlying anodized aluminum layer, grit blast media such as alumina or silica have been used to remove overspray coating but in some cases the process has not been very selective. Use of such media has been found to not only remove the overspray coating, but also significantly damage the anodized under layer thereby exposing the bulk aluminum. The process window conditions to yield a good outcome have been very narrow and are not likely feasible for scaling up to production volumes due to concerns about damaging the parts.

Modification of the surface with a molecular monolayer or sacrificial inorganic thin film serving as masks that are compatible with the plasma spray coat deposition conditions can modulate the surface characteristics to minimize or eliminate adhesion of the subsequent thermal spray coating process. These modifications afford independent and effective ways to solve and eliminate the overspray problem.

FIG. 1 is a flow chart of an embodiment. A part is cleaned (step 104). A patterned mask is placed on the part (step 108). A film is deposited on the part (step 112). The patterned mask is removed (step 116). The part is cleaned (step 120). A plasma resistant ceramic coating is applied to the part (step 124). The overspray coating is removed (step 128). The part is subjected to additional cleaning (step 132).

An example provides a selective method for treating a machined fabricated chamber part made from material, such as anodized aluminum or aluminum, with a surface having features (such as high aspect ratio pump slots features and wafer slots) known to load with an unwanted amount of overspray deposition during a thermal plasma spray coating process. The part in this example has an anodized aluminum surface. The method includes, in one approach sequence, selectively chemically treating certain pre-masked surface regions on the part to functionalize them with a molecular monolayer that serves as the subsequent mask for the spray coat process. The monolayer functionalized regions of the machine fabricated part with a complex part architecture completely inhibit and/or minimize subsequent spray coat adhesion on to surfaces of the part. The part then could be subjected to plasma spray coat or any alternative deposition process to coat the desired locations intended to be coated with a plasma resistant ceramic coating. After completion of the coating, any overspray that is deposited on the functionalized masked regions can be blown off, wiped off, or easily cleaned through gentle clean methods such as carbon dioxide ($CO_2$) or alternative soft bead blasting to remove any unwanted residual material through a lift off mechanism for example. The part after cleaning exhibits superior spray coat termination defined by the masking with no effective overspray deposition.

A film may be applied as a monolayer mask through self-assembly in vapor or liquid phase or any other alternative deposition processes. The purpose for the film is to chemically change the reactive moieties on the surface such that the adhesion forces between the spray coat and the surface can be altered (in this case minimized and/or eliminated) thereby preventing adhesion of any subsequent overcoat that is deposited on to the surface of the monolayer mask. One example of a chemical change that would modulate surface adhesion would be substituting polar hydroxyl groups of an anodized aluminum surface (for example anodized aluminum (Al-Ox) or hydroxylated aluminum (Al—OH) with nonpolar groups such as Si—$CH_2$—$CH_2$ ($CF_2$-)n-$CF_3$). Moreover, because such monolayers on surfaces generally possess low surface energies, the propensity for van der Waals attraction between surfaces would also be reduced.

A sequence, in a first embodiment, begins by masking the part such that regions intended to be chemically modified with a film are not masked. Alternatively, the forming of the film could be performed with a chemical precursor agent in solution prior to surface plasma spray coating. These and other steps of this embodiment will be described in more detail below.

Example 1

Figure 2A:
FIGS. 2A-F are schematic cross-sectional views of a surface of a part processed according to the embodiment of FIG. 1.
Figure 2B:
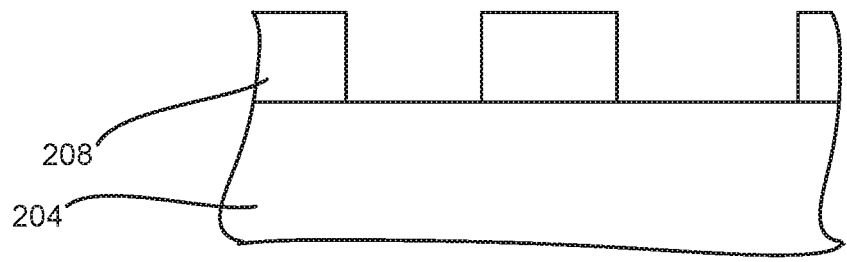

FIG. 2A is a schematic cross-sectional view of a part 204, which, in this example, has an anodized aluminum surface. The surface is pre-cleaned (step 104) to remove organic or inorganic debris or micro-contamination thereby leaving the surface termination groups chemically active (for example hydroxylated) for the subsequent reaction with a chemical precursor agent. At least one active surface on the part 204 is present and masked (step 108) using a masking scheme to expose only areas that will require coating adhesion inhibition. The masking scheme can be effected through a hard or soft mask. Some examples of materials used in the masking scheme could include adhesive tapes, such as those used in coating applications, (Kapton, powder coatings, 3M tapes, photosensitive resists, paints, silicones, hardmasks, etc. . . . ). FIG. 2B is a schematic cross-sectional view of the part 204 after a Kapton mask 208 has been applied.

A film is then deposited over the surface of the part (step 112). In this embodiment, the exposed areas of the masked surface are reacted with a chemical precursor agent. In this embodiment, this procedure may include depositing a monolayer of the chemical precursor agent from a solution of a compound dissolved in a non-aqueous solvent. Non-aqueous solvents may include, for example, anhydrous n-hexane, n-heptane, Toluene, chloroform, acetone, NPM n-methyl-2-pyrrolidone, DMSO dimethyl sulfoxide, DMF dimethylformamide, DMAC dimethylacetamide, or HFE hydrofluoroether.

One example of a chemical modification from a chemical precursor agent that would modulate adhesion would be substituting polar hydroxyl groups of the exposed anodized aluminum surface (for example Al-Ox, Al—OH) with nonpolar groups. The nonpolar groups may be silane compounds containing components, such as Si—$CH_3$, Si—R or Si—RF (where R is a hydrocarbon or fluoro substituted chain of n-length). The Al—O—Si—R groups may be provided, for example, by 1H, 1H, 2H, 2H-perfluorooctyl-trichlorosilane (FOTS, $C_8F_{13}H_4SiCl_3$). The perfluoronated organosilane termination provides a stable modified surface with deionized water (DIW) contact angles varying from >110-130° where excessive adhesion forces due to chemical bonding formation can be modulated. Some other examples of other potential surface modifying agents include hexamethyldisilazane (HMDS), alkoxysilanes and alkysilanes. More specifically, fluorinated or long chain hydrocarbon based trichlorosilane, dichlorosilane, monochlorosilane, trimethoxysilane, dimethoxysilane, methoxysilane, triethoxysilane, diethoxysilane, and ethoxysilanes. Some of theses silanes are silanes containing a polymer component.

By way of example, a sample process flow using FOTS first begins by generating a stock solution of a chemical agent by mixing 1 volume of FOTS with 9 volumes of anhydrous n-hexane, then co-heating a few drops of the stock solution with the sample to be modified in a 110° C. vented oven in an enclosed reaction vessel. After 30 seconds, the stock solution evaporates completely and FOTS molecules react with the sample surface. Additional examples of the vapor deposition process may include vaporizing the chemical precursor agent with the aid of heating under a reduced vacuum environment such that the chemical precursor agent can be easily vaporized within a desirable temperature range that is compatible with the bulk surface. Reaction durations can include approximately 2 minutes, approximately 4 minutes, approximately 6 minutes, approximately 8 minutes, approximately 10 minutes, approximately 15 minutes, and all ranges formed from combinations of the range of the chemical precursor agent concentration, deposition temperatures, and deposition times. A surface prepared this way has a DIW contact angle greater than 120°.

Alternatively, the chemical precursor agent may be added during a wet phase processing step from solution by use of suitable solvents containing the modifying agent. By way of example, a sample process using FOTS is immersing the sample into 0.2% by weight of FOTS in HFE-7100 (3M, Minneapolis, Minn.), toluene, n-hexane, chloroform, acetone, NPM, DMSO, Acetone, DMF, or DMAC, for 1 hour under nitrogen, followed by rinsing ultrasonically with fresh HFE-7100, then drying with nitrogen.

Figure 2C:
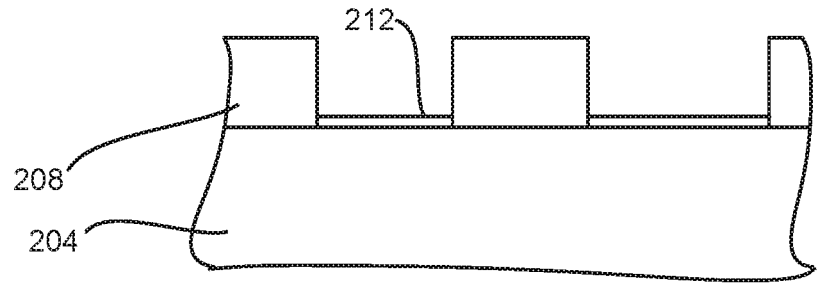

FIG. 2C is a schematic cross-sectional view of the part 204 after a film 212 has been deposited. In this embodiment, the film 212 is only deposited on the exposed surface of the part 204 and not on areas covered by the Kapton mask 208.

After the chemical functionalization, which forms the film, is completed, the patterned mask (e.g., the Kapton mask 208) is removed (step 116). The method may include removing the initial soft or hard mask, followed by soaking, flushing, and/or wiping the surface of the part with solvent such as isopropyl alcohol (IPA), acetone, n-hexane, and/or toluene to clean off the areas that were previously masked. In one embodiment, after this clean step, the surface is flushed with DIW. The deionized water flush is preferably at approximately 30 psi to approximately 50 psi. Nonexclusively, additional examples of the deionized water flush pressure include approximately 10 psi, approximately 20 psi, approximately 25 psi, approximately 35 psi, approximately 45 psi, approximately 50 psi, approximately 60 psi and ranges formed from combinations of the disclosed values. If the part is fabricated such that through holes are present, the flushing is done such that there is efficient fluid exchange within the holes.

Figure 2D:
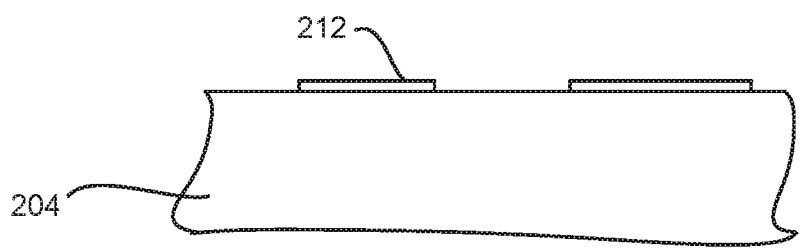

The part 204 may undergo an additional cleaning (step 120). The part 204 may undergo additional chemical wipe step where all the surfaces of the part 204 are wiped or soaked with IPA and/or other aforementioned solvents which may also subsequently be followed by blast cleaning techniques such as $CO_2$ clean. In a further embodiment, the method further comprises wiping/soaking all surfaces of the part 204 with acetone. In another embodiment, the wipe is made of polyester or polyurethane woven cleanroom fabric. In an alternate embodiment, the wipe is made of specially designed woven fabrics found to be more efficient in removing debris such as MiraWIPE®. Wiping with organic solvents such as isopropyl alcohol and/or acetone removes oils and other organic contaminates that may have been left over from the adhesive material used to mask the part. It is anticipated that additional thermal methods and/or chemical formulations such as non-ionic, and anionic surfactants, which can remove oils or other contaminants from surface without any undue harm to the functionalized surface known to one skilled in the art may be also utilized. FIG. 2D is a schematic cross-sectional view of the part 204 after the patterned mask has been removed and the part 204 is cleaned. The film 212 remains.

Figure 2E:
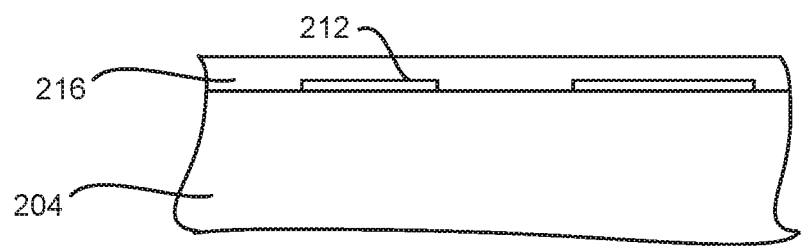

After the chemical wipe step with isopropyl alcohol and/or acetone, in an embodiment, the embodiment further includes the transfer of the part 204 into a plasma thermal spray coat environment for plasma spray coat deposition on to the areas of the part 204 intended to be coated. A plasma resistant ceramic coating is applied to the surface of the part 204 (step 124). In this example, the plasma resistant ceramic coating is applied by thermal spraying. Thermal spraying is a general term used to describe a variety of coating processes, such as plasma spraying, arc spraying, and flame/combustion spraying. All thermal spraying uses energy to heat a solid material to a molten or plasticized state. The molten or plasticized material is accelerated towards the part 204, so that the molten or plasticized material coats the surface of the part 204. The molten or plasticized material is then cooled. Preferably, plasma spraying is used to provide the yttria coating. These thermal spraying processes are distinct from vapor deposition processes, which use vaporized material instead of molten material. Thermal spray coatings use robotically controlled coating systems that offer corrosion resistance materials such as yttrira, alumina, yttria stabilized zirconia, composite blends, and co-phase coatings with high bond strength. FIG. 2E is a schematic cross-sectional view of the part 204 after a thermal spray layer 216 has been deposited.

The overspray is then removed (step 128). The overspray may be removed by either removing the film 212 and parts of the thermal spraying on the film 212 or by removing parts of the thermal spraying on the film 212 without removing the film 212. The part 204 may undergo another series of chemical cleaning steps where all the surfaces of the part 204 are soaked again in IPA. The soaking, wiping, or scrubbing is intended to remove any residual overspray that is poorly adsorbed or deposited on top of the chemically functionalized areas. This is continued for approximately 5 to approximately 15 minutes. After the IPA soak step, the method may include flushing the surface of the part 204 with filtered deionized water in a deionized water flushing step. The deionized water flush is preferably at approximately 20 psi to approximately 50 psi. In the next step, the method further comprises soaking all surfaces of the part 204 in acetone. This is continued for approximately 5 to approximately 15 minutes. After the acetone soak step, the method may include flushing the surface of the part 204 once again with filtered deionized water in a deionized water flushing step. The deionized water flush is preferably at approximately 20 psi to approximately 50 psi.

After the overspray is removed, additional cleaning may be done (step 132) through several alternative pathways to remove any residual left-over loosely adhered material from areas where overspray has occurred. In one method, the solid $CO_2$ in the form of fine shavings is used in combination with compressed air as the blasting gas to initially bombard the surface. Testing found a set of process conditions that were effective in removing gross organic stains and residues along with overspray coat particle debris from regions where the film had been deposited and overspray was loosely adhered. In an embodiment, the solid $CO_2$ dry ice conditioning of the surface is at approximately 25 psi to approximately 70 psi. Additionally, examples of the $CO_2$ dry ice blasting pressure include approximately 20 psi, approximately 25 psi, approximately 30 psi, approximately 35 psi, approximately 40 psi, approximately 50 psi, approximately 60 psi, approximately 70 psi and all other ranges formed from combinations of those disclosed values here. The dry ice shavings are produced from high purity solid blocks or pellets passed through a hopper equipped with a series of rotary blades that is fed at rates of approximately 0.5 pounds/min, approximately 1 pound/min, approximately 1.25 pound/min, approximately 1.5 pound/min, approximately 1.75 pound/min, approximately 2 pound/min, approximately 2.5 pound/min, approximately 2.75 pound/min, approximately 3 pound/min, up to 4 pounds/min and all other ranges that are formed from combinations of aforementioned pressures and feed rates. In an embodiment, the dry ice blasting step is continued for approximately 30 seconds to approximately 10 minutes using a fan shaped dispense nozzle that impinges a stream of submicron shaved ice particles within a 1-1.5 inch swath spray pattern on to the working surface from a distance ranging from approximately 1-12 inches away at an angle that ranges anywhere from shallow glancing to orthogonal with a working surface. In another embodiment, the $CO_2$ dry ice blasting of the surface is continued for approximately 8 minutes to approximately 20 minutes. In another embodiment, the $CO_2$ dry ice blasting of the part is continued for approximately 18 minutes to approximately 30 minutes. Additionally, examples of the $CO_2$ dry ice blasting duration include approximately 2 minutes, approximately 4 minutes, approximately 6 minutes, approximately 8 minutes, approximately 10 minutes, approximately 15 minutes, and all ranges formed from combinations of spray times, working distances, and spray angles as mentioned. In other embodiments, detergents, ultrasonication or megasonication, water jet, or soft blasting media, such as soft beads, may be used to remove the overspray.

In an alternate embodiment, the solid $CO_2$ dry ice blasting can be replaced with a method to remove gross contaminates and overspray coat particle debris on top of the monolayer functionalized regions. The method comprises first wiping all surfaces with isopropyl alcohol. The method further comprises wiping or soaking all surfaces with acetone. The wipe is made of polyester or polyurethane woven clean room fabric. In an alternate embodiment, the wipe is made of specially designed woven fabrics found to be more efficient in removing particulate debris such as a Mira wipe. In another embodiment, the wiping is done using polyvinyl alcohol (PVA) brushes or sponges. In another embodiment, the wiping is done using Scotch-Brite™ pads or use of alternative polishing media. Soaking or wiping with solvents such as isopropyl alcohol and/or acetone removes gross oils and other contaminates from the surfaces. In another embodiment, the part can afterwards be soaked into any of the aforementioned mixed chemical solutions or sequential combinations thereof such as use of dilute ammonia solutions ($NH_4OH:H_2O$) from 0.01% to 28% or SC1 solutions ($NH_4OH:H_2O_2:H_2O$) mix (1:1:50), for 1 to approximately 15 minutes. This is followed by rinses with pressurized deionized water and/or subsequently followed with any subsequent ultrasonication or megasonication condition using chemistry or deionized water.

Figure 2F:
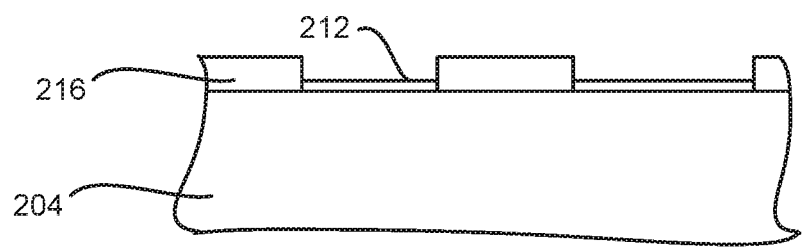

Additional cleaning may be provided after the overspray has been removed (step 128). FIG. 2F is a schematic cross-sectional view of the part 204 after the thermal spray layer 216 on the film 212 has been removed. In this example, the monolayer forming the film 212 has not been removed.

Example 2

In an alternative example, a sacrificial layer, such as a thin film mask, is made from inorganic materials that can be vapor deposited and that is compatible with the plasma spray coat process. After the plasma spray coat process is completed, the sacrificial layer can later be wet cleaned and or wet etched to undercut and liftoff the overspray coat with good etch selectivity of the sacrificial layer compared to the spray coat.

Figure 3:
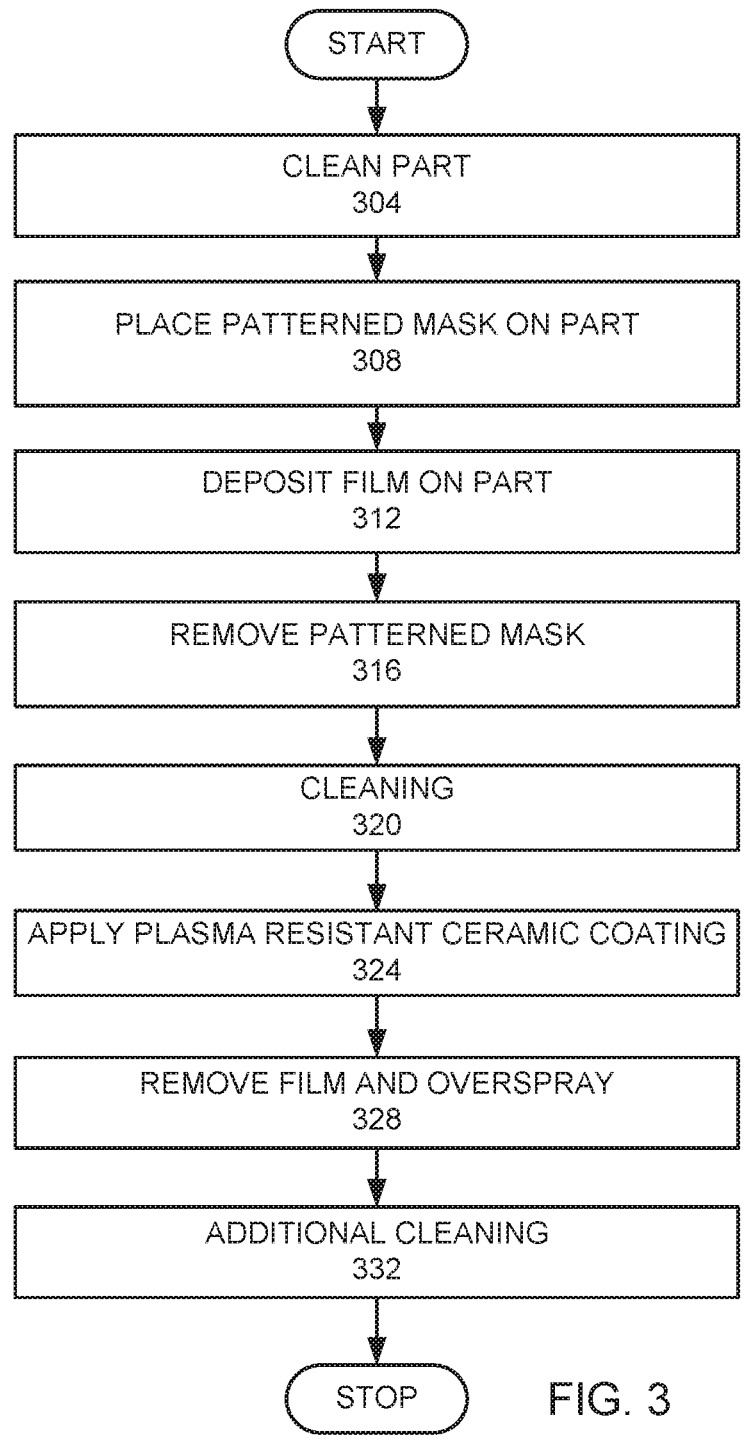
FIG. 3 is a high level flow chart of another embodiment.
Figure 4A:
FIGS. 4A-F are schematic cross-sectional views of a surface of a part processed according to the embodiment of FIG. 3.
Figure 4B:
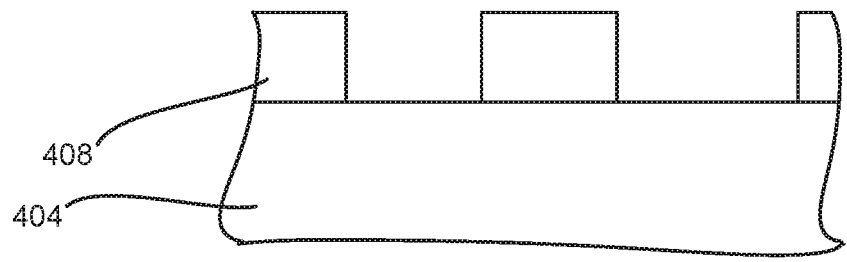

FIG. 3 is a high level flow chart of a process used in this example. FIG. 4A is a schematic cross-sectional view of a part 404, which, in this example, has an anodized aluminum surface. At the start of this example, the part 404 is cleaned (step 304). The cleaning removes organic or inorganic debris or micro-contamination thereby leaving the surface termination groups chemically active (for example hydroxylated) for the subsequent reaction with a precursor agent. A patterned mask is placed on the part 404 (step 308). At least one active surface on the part 404 is present and masked using a masking scheme to expose only areas that will require coating inhibition. The masking scheme can be through a hard or soft mask. Some examples of materials used in the masking scheme could include adhesive tapes such as those used in coating applications (Kapton, powder coatings, photosensitive resists, paints, etc. . . . ). FIG. 4B is a schematic cross-sectional view of the part 404 after a Kapton mask 408 has been applied using the masking scheme.

Figure 4C:
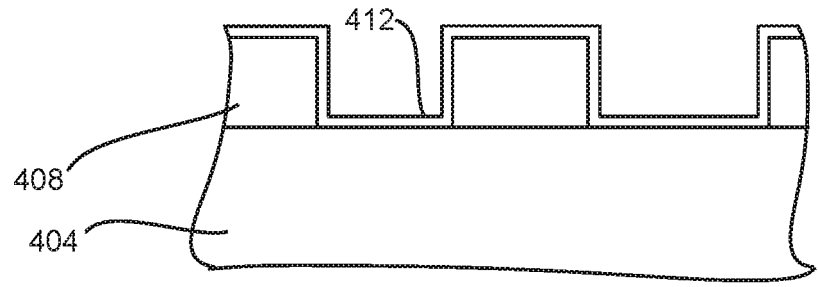

A film is deposited on the exposed regions forming a sacrificial layer (step 312). The exposed regions of the masked surface are reacted with a chemical vapor that deposits a thin film with a thickness of about 1 nm to about 1 micron of inorganic materials such as polysilicon, silicon oxide, or any other suitable inorganic metal such as Ag serving as the sacrificial layer. The thin sacrificial layer offers selectivity in clean steps that are to follow the application of the plasma resistant ceramic coating. The materials can be selectively wet etched to undercut and lift off the plasma resistant ceramic coating using chemistry that is selective and that will only react with the sacrificial layer and not dissolve the plasma resistant ceramic coating. FIG. 4C is a schematic cross-sectional view of the part 404 after a film 412 has been deposited. In this embodiment, the film 412 is deposited on the exposed surface of the part 404 and on the Kapton mask 408.

Figure 4D:
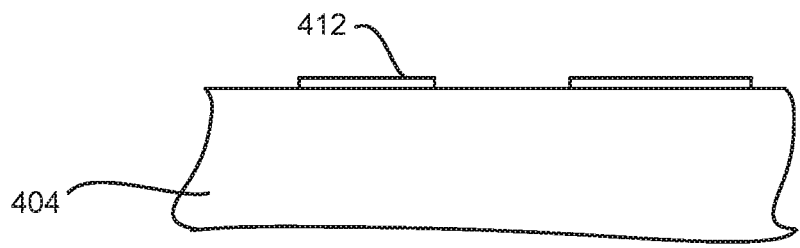

The patterned mask is removed (step 316). This step may include removing the initial soft or hard mask followed by a cleaning (step 320), such as soaking, flushing, and/or wiping the surface of the part with solvent such as IPA, acetone, n-hexane, and or toluene to clean off the areas that were previously masked. FIG. 4D is a schematic cross-sectional view of the part 404 after the patterned mask has been removed (step 316) and the part has been cleaned (step 320). Only the film 412 deposited on the surface of the part 404 remains.

Figure 4E:
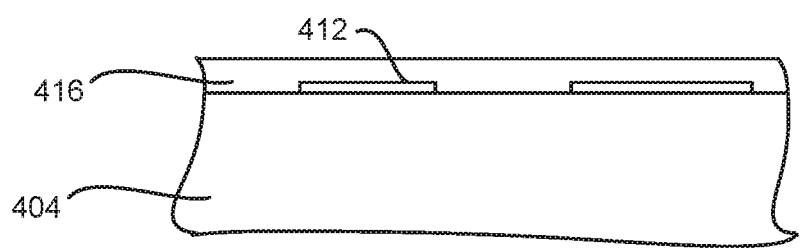

A plasma resistant ceramic coating is applied to the surface of the part (step 324). After the chemical wipe step with isopropyl alcohol and/or acetone, this embodiment further includes the transfer of the part into a plasma thermal spray coat environment for plasma spray coat deposition on to the areas of the part intended to be coated. FIG. 4E is a schematic cross-sectional view of the part 404 after a thermal spray layer 416 has been deposited.

Figure 4F:
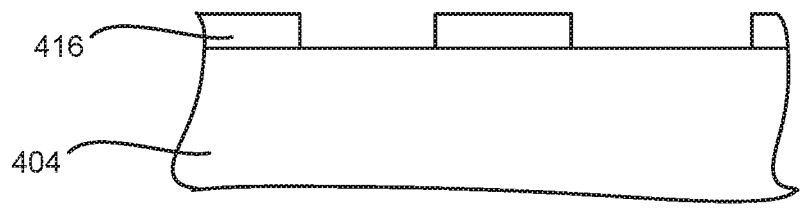

The film and the overspray are then removed (step 328). After the thermal spraying process, the part may undergo another series of chemical cleaning steps where all the surfaces of the part are soaked again in IPA. The soaking, wiping, blasting, or scrubbing is intended to remove any residual overspray that is poorly adsorbed or deposited on top of the chemically functionalized areas in the prior steps. FIG. 4F is a schematic cross-sectional view of the part 404 after the film and the thermal spray deposition 416 on the film has been removed.

This additional cleaning may be done (step 332) through several alternative pathways to remove any residual leftover loosely adhered material from areas of termination where overspray has occurred. In one method, solid $CO_2$ in the form of fine shavings is used in combination with compressed air as the blasting gas to initially bombard the surface. In another embodiment, the part can afterwards be soaked into any of the aforementioned mixed chemical solutions or sequential combinations thereof such as use of dilute, potassium hydroxide, or ammonia solutions ($NH_4OH:H_2O$) from 0.01% to 28% or AMP solutions ($NH_4OH:H_2O_2:H_2O$) mix (1:1:2-50), dilute hydrogen fluoride/hydrogen peroxide mix or buffered ammonium and hydrogen fluoride solutions with glycerin, or glycols for 1 to approximately 30 minutes. This is followed by rinses with pressurized deionized water and/or subsequently followed with any blasting, scrubbing, ultrasonication or megasonication condition using chemistry or deionized water.

The current disclosure provides methods to yield a plasma thermal spray coated part that exhibits superior spray coat termination defined by precision masking with no effective overspray deposition. The method avoids directly soft or hard masking the part with bulk materials that are subjected directly to the plasma thermal spray coat process conditions. The method avoids using aggressive bead blast cleaning approaches that either lack a wide process window having been found to damage the under layer anodized aluminum surfaces and thereby exposing aluminum or that add significant contamination due to generation of undesirable blast debris. The use of conventional bead blasting media and techniques to remove overspray have also been found to be very production unfriendly due to the complexity of part architecture and the workmanship required by the operator to achieve acceptable results. Moreover, any service likely will be associated with increase in cost of the manufactured part due to such inefficiencies and problems with poor product yield.

The proposed methods allow for direct chemical functionalization of the bulk surface with a monolayer or thin film of inorganic compounds that are more suitable for plasma thermal spray conditions and lead to no issues regarding bulk contamination. It also avoids the use of hard masks which can modify spray flow dynamics during the coating process leading to issues with termination and edge break regions.

The method allows for use of extremely more gentle and cleaner techniques to remove loosely adhered overspray which are chemically compatible with the rest of the part. These can be done with dry ice blasting and or chemical dissolution of sacrificial layers and undercut liftoff clean mechanism. These noted differences will help simplify the complexity of the technical aspects of this manufacturing process and inevitably be much more production friendly and cost effective.

The part may be used in a plasma processing chamber. The thermal spray coating is able to provide protection in etch plasma environments at temperatures up to about 1000° C. The patterned thermal spray coating may be used on high flow liners of an etch chamber.

Figure 5:
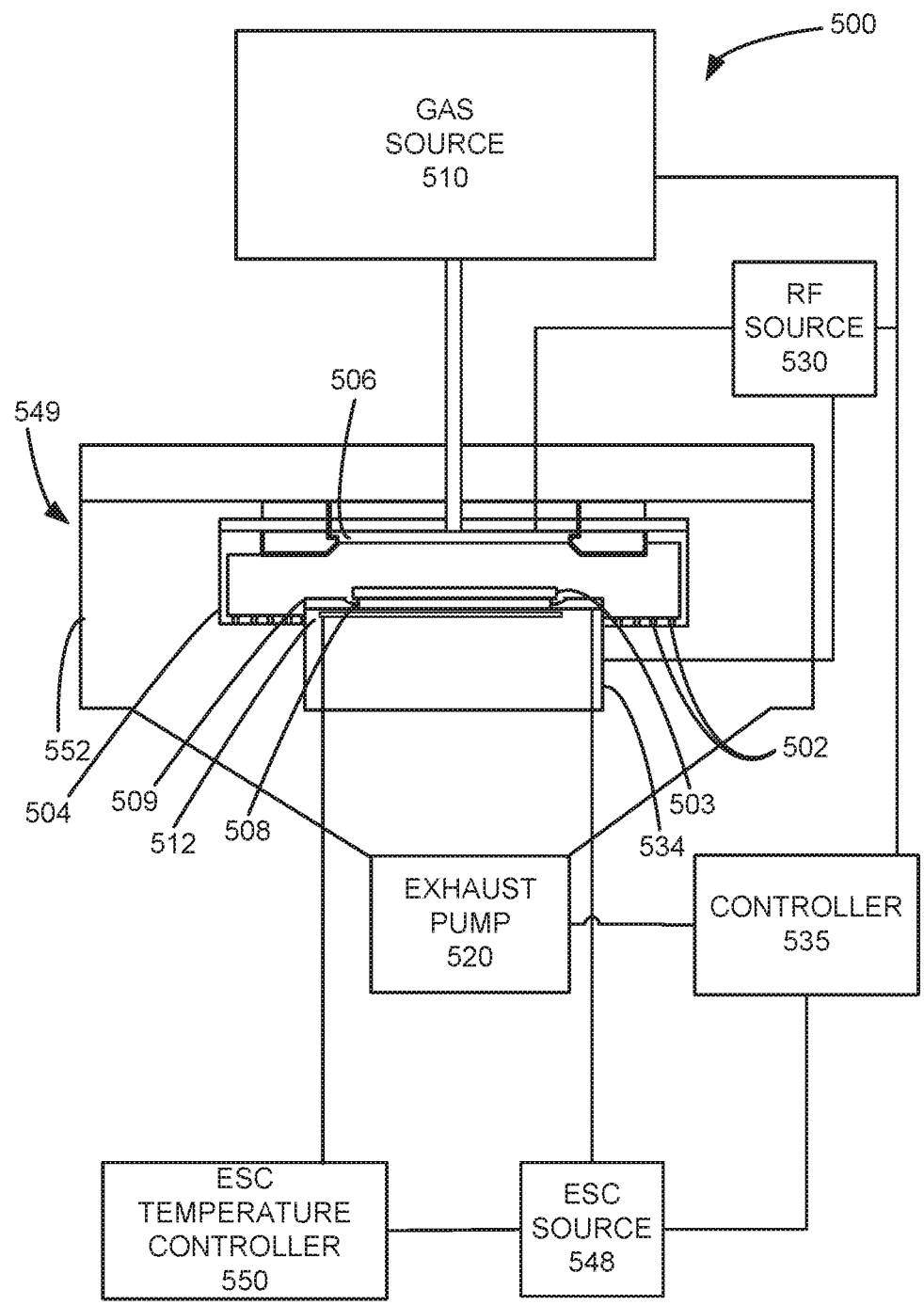
FIG. 5 is a schematic view of a plasma processing chamber with at least one part coated according to an embodiment.

FIG. 5 is a schematic view of an etch reactor in which an embodiment may be used. In one or more embodiments, a plasma processing chamber 500 comprises a gas distribution plate 506 providing a gas inlet and an electrostatic chuck (ESC) 508, within an etch chamber 549, enclosed by a chamber wall 552. Within the etch chamber 549, a stack 503 is positioned over the ESC 508, which is a substrate support. An edge ring 509 surrounds the ESC 508. An ESC source 548 may provide a bias to the ESC 508. A gas source 510 is connected to the etch chamber 549 through the gas distribution plate 506. An ESC temperature controller 550 is connected the ESC 508. A radio frequency (RF) source 530 provides RF power to a lower electrode and/or an upper electrode, which in this embodiment are the ESC 508 and the gas distribution plate 506. In an exemplary embodiment, 400 kHz, 60 MHz, and optionally 2 MHz, 27 MHz power sources make up the RF source 530 and the ESC source 548. In this embodiment, the upper electrode is grounded. In this embodiment, one generator is provided for each frequency. In other embodiments, the generators may be in separate RF sources, or separate RF generators may be connected to different electrodes. For example, the upper electrode may have inner and outer electrodes connected to different RF sources. Other arrangements of RF sources and electrodes may be used in other embodiments. A controller 535 is controllably connected to the RF source 530, the ESC source 548, an exhaust pump 520, and the gas source 510. A high flow liner 504 is a liner within the etch chamber 549, which confines gas from the gas source and has slots 502, which allows for a controlled flow of gas to pass from the gas source 510 to the exhaust pump 520. An example of such an etch chamber is the Exelan Flex™ etch system manufactured by Lam Research Corporation of Fremont, Calif.

In an embodiment, the interior of the aluminum high flow liner 504 is coated with a thermal spray coating of yttria. In this embodiment, the insides of the slot 502 and various parts of the interior of the high flow liner 504 are not coated.

In this embodiment, the patterned mask is applied to parts of the interior of the high flow liner 504 that are to be coated (step 108). The film is deposited on parts of the high flow liner 504 that are not to be coated, such as inside the slots 502. The patterned mask is removed (step 116). The interior of the high flow liner 504 is thermal sprayed with an yttria coating (step 124). Overspray inside the slots 502 and other parts covered with the film is removed (step 128). After additional processing, such as additional cleaning (step 132), the high flow liner 504 may be placed in a plasma processing chamber and used for plasma processing.

In some of the embodiments, overspray is deposited on the film and then subsequently removed. In other embodiments, the thermal deposition does not deposit on the film, and therefore a removal step of overspray is not needed. In some embodiments the film may be a molecular monolayer or multilayer film formed from a precursor comprising a silane containing component or alternative thermally stable ultraviolet (UV) curable commercial blends. In some embodiments, the film has a thickness of less than about 1 mm.

In some embodiments, the thermal spray coating may be replaced by other plasma resistant ceramic coatings. Such plasma resistant ceramic coatings may be applied by thermal spraying, physical vapor deposition (PVD), chemical vapor deposition (CVD), plasma enhanced chemical vapor deposition (PECVD), atomic layer deposition (ALD), or electrodeposition. Such plasma resistant ceramic coatings are more resistant to plasma etching or corrosion than the part being coated. The plasma resistant ceramic coating may comprise one or more of yttria, zirconia, alumina, composite blends, co-phase coatings with high bond strength that can be made from other lanthanide series of Group III or Group IV elements.

While this disclosure has been described in terms of several preferred embodiments, there are alterations, modifications, permutations, and various substitute equivalents, which fall within the scope of this disclosure. It should also be noted that there are many alternative ways of implementing the methods and apparatuses of the present disclosure. It is therefore intended that the following appended claims be interpreted as including all such alterations, modifications, permutations, and various substitute equivalents as fall within the true spirit and scope of the present disclosure.

What is claimed is:

1. A method for providing an etch chamber part with a plasma resistant ceramic coating, comprising:
    placing a patterned mask on the etch chamber part, wherein the patterned mask comprises a layer of at least one of a powder coating, adhesive tapes, photosensitive resist, paint, silicones, or hardmasks;
    depositing a film over the etch chamber part, wherein the film is a molecular monolayer;
    removing the patterned mask after depositing the film;
    applying a plasma resistant ceramic coating on the etch chamber part after removing the patterned mask; and
    removing the film after applying the plasma resistant ceramic coating on the part.

2. The method, as recited in claim 1, wherein the removing the film removes part of the plasma resistant ceramic coating that is applied over the film.

3. The method, as recited in claim 1, wherein the film is a monolayer formed from a chemical precursor agent of at least one of a group comprising of hexamethyldisilazane (HMDS), alkoxysilanes and alkylsilanes.

4. The method, as recited in claim 1, further comprising removing one or more parts of the plasma resistant ceramic coating that is deposited over the film, comprising wiping or soaking the plasma resistant ceramic coating with at least one of isopropyl alcohol, PVA, alternative soft scrubbing or polish media, acetone, hydrogen fluoride/hydrogen peroxide solution, hydrogen fluoride solutions with glycerin, glycols or an ammonia containing solution or cleaning with detergents, ultrasonication or megasonication, water jet, $CO_2$ blasting or soft bead blasting.

5. The method, as recited in claim 1, further comprising removing one or more parts of the plasma resistant ceramic coating that is deposited over the film, comprising directing solid $CO_2$ shavings towards the plasma resistant ceramic coating at a pressure greater than about 25 psi, wherein parts of the plasma ceramic coating that are not over the film are not removed.

6. The method, as recited in claim 1, wherein the applying the plasma resistant ceramic coating comprises applying a thermal spray coating.

7. The method, as recited in claim 1, further comprising cleaning the part after the removing the patterned mask and before applying the plasma resistant ceramic coating.

8. The method, as recited in claim 1, wherein the plasma resistant ceramic coating comprises one or more of yttria, zirconia, or alumina.

9. The method, as recited in claim 1, wherein the plasma resistant ceramic coating comprises one or more of a lanthanide series of a Group III or Group IV element.

10. The method, as recited in claim 1, wherein the etch chamber part is at least one of a chamber liner, door, or pinnacle.

11. The method, as recited in claim 1, wherein the applying the plasma resistant ceramic coating is after removing the patterned mask, and wherein the removing the patterned mask is after depositing the film, and wherein the depositing the film is after placing the patterned mask.

12. The method, as recited in claim 1, further comprising using the part as a chamber liner, chamber door, or chamber pinnacle in an etch chamber.

* * * * *